United States Patent
Liu et al.

(10) Patent No.: US 9,591,471 B2
(45) Date of Patent: Mar. 7, 2017

(54) NON-CALL SERVICE PROCESSING METHOD, APPARATUS AND SYSTEM IN CIRCUIT SWITCH FALLBACK SYSTEM

(71) Applicant: ZTE Corporation, Shenzhen, Guangdong (CN)

(72) Inventors: Jingxiang Liu, Shenzhen (CN); Xiaofei Cao, Shenzhen (CN); Changle Zou, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 14 days.

(21) Appl. No.: 14/421,973

(22) PCT Filed: Sep. 9, 2013

(86) PCT No.: PCT/CN2013/083158
§ 371 (c)(1),
(2) Date: Feb. 16, 2015

(87) PCT Pub. No.: WO2014/044128
PCT Pub. Date: Mar. 27, 2014

(65) Prior Publication Data
US 2015/0237494 A1   Aug. 20, 2015

(30) Foreign Application Priority Data
Sep. 18, 2012  (CN) .......................... 2012 1 0346496

(51) Int. Cl.
*H04W 4/00* (2009.01)
*H04W 8/06* (2009.01)
(Continued)

(52) U.S. Cl.
CPC ............. *H04W 8/06* (2013.01); *H04W 60/00* (2013.01); *H04W 64/00* (2013.01)

(58) Field of Classification Search
CPC ........ H04W 8/06; H04W 60/00; H04W 64/00
(Continued)

(56) References Cited

U.S. PATENT DOCUMENTS

| | | | |
|---|---|---|---|
| 5,713,073 A | 1/1998 | Warsta | |
| 6,684,073 B1 | 1/2004 | Joss | |

FOREIGN PATENT DOCUMENTS

| | | | | |
|---|---|---|---|---|
| CN | 1135826 A | 11/1996 | | |
| CN | WO 2011130904 A1 | * 10/2011 | ............ | H04W 60/00 |

(Continued)

OTHER PUBLICATIONS

International Search Report in international application No. PCT/CN2013/083158, mailed on Dec. 12, 2013.
(Continued)

*Primary Examiner* — Tanmay Shah
(74) *Attorney, Agent, or Firm* — Oppedahl Patent Law Firm LLC

(57) ABSTRACT

A non-call service processing method, apparatus and system in a Circuit Switch Fallback (CSFB) system are provided. The method includes that UE transmits a location updating request to VLR2 where a new LAI is located; VLR2 receiving the location updating request transmits a location updating request to a HLR; the HLR receiving the location updating request transmits a location cancellation message carrying an address of VLR2 to VLR1 where original LAI is located; VLR1 receiving the location cancellation message forwards a received non-call service request to VLR2; VLR2 processes the received non-call service request, and transmits a processing result to VLR1; and VLR1 transmits the received processing result to the HLR or a GMLC which transmitted the non-call service request. Thus the interruption of a non-call service can be avoided, and the normal use of UE can be ensured.

10 Claims, 5 Drawing Sheets

(51) Int. Cl.
*H04W 64/00* (2009.01)
*H04W 60/00* (2009.01)

(58) Field of Classification Search
USPC .......................................................... 455/433
See application file for complete search history.

(56) References Cited

FOREIGN PATENT DOCUMENTS

| FI | CN 1135826 A | * | 11/1996 | ............... H04W 8/06 |
|----|--------------|---|---------|---------------------------|
| WO | 2011130904 A1 | | 10/2011 | |

OTHER PUBLICATIONS

English Translation of the Written Opinion of the International Search Authority in international application No. PCT/CN2013/083158, mailed on Dec. 12, 2013.

MT USSD support for CSFB, mailed on Nov. 16, 2012.
Reply LS on Roaming Forwarding of signalling for CS fall back, mailed on Nov. 15, 2013.
Mobile terminating CS services and LU to new MSC, mailed on Sep. 18, 2013.
3rd Generation Partnership Project; Technical Specification Group Core Network and Terminals; Basic call handling; Technical-realization; XP050476908, mailed on Apr. 4, 2011.
Digital cellular telecommunications system; Universal Mobile Telecommunications System; LTE; Circuit Switched(CS) fallback in Evolved Packet System; XP014065847, mailed on Jun. 1, 2011.
3rd Generation Partnership Project; Technical Specification Group Core Network and Terminals; Unstructured Supplementary Service Data(USSD), XP050477370 mailed on Apr. 8, 2011.
Supplementary European Search Report in European application No. 13840102.1, mailed on Sep. 15, 2015.

* cited by examiner

NON-CALL SERVICE PROCESSING METHOD, APPARATUS AND SYSTEM IN CIRCUIT SWITCH FALLBACK SYSTEM

TECHNICAL FIELD

The disclosure relates to the field of wireless communications, in particular to a non-call service processing method, apparatus and system in a Circuit Switch Fallback (CSFB) system.

BACKGROUND

A System Architecture Evolution (SAE) network is a new-generation wireless network provided by the $3^{rd}$ Generation Partnership Project (3GPP) organization to substitute for a conventional circuit switch network. A wireless network in the current transition stage consists of an SAE network and a conventional circuit switch network. The conventional circuit switch network has a better wireless coverage and a higher service stability, so that for a certain business, User Equipment (UE) in the SAE network can fall back into the conventional circuit switch network, and the service about the business can be provided for the UE by the conventional circuit switch network; and such a technology is called a CSFB technology.

However, the following condition may occur in the CSFB system: before UE falls back into the conventional circuit switch network, a Location Area Identity (LAI) of the UE in the conventional circuit switch network is located in a Visitor Location Register (VLR) which can be recorded as VLR1, the UE falls back when VLR1 has not processed a received non-call service request, and after the UE falls back into the conventional circuit switch network, the LAI of the UE in the conventional circuit switch network is changed, a new LAI is located in another VLR which can be recorded as a second VLR (VLR2), and then VLR2 receives a new non-call service request and processes the received non-call service request instead. Under such a condition, VLR1 cannot feed back a processing result of the non-call service request received before fallback, and moreover, VLR2 does not know the non-call service request sent to VLR1 before fallback, so that the non-call service request cannot be processed, which causes the interruption of a non-call service and has influence on the normal use of a user over the UE. The non-call service includes a Provide Subscriber Information (PSI) service, a called call unrelated supplementary service and a called location service.

SUMMARY

In view of this, the embodiments of the disclosure provide a non-call service processing method, apparatus and system in a CSFB system, which can avoid the interruption of a non-call service and ensure the normal use of UE.

To this end, the technical solutions of the embodiments of the disclosure are implemented as follows.

One embodiment of the disclosure provides a non-call service processing method in a CSFB system, the method including that:

when UE falls back to a conventional circuit switch network and determines that its own LAI in the conventional circuit switch network is changed, the UE transmits a location updating request to a second VLR (VLR2) where a new LAI is located;

the VLR2 receiving the location updating request transmits a location updating request to a Home Location Register (HLR);

the HLR receiving the location updating request transmits a location cancellation message carrying an address of the VLR2 to a first VLR (VLR1) where original LAI is located;

the VLR1 receiving the location cancellation message forwards a received non-call service request to the VLR2;

the VLR2 processes the received non-call service request, and transmits a processing result to the VLR1; and the VLR1 transmits the received processing result to a network element which transmitted the non-call service request.

Preferably, after the UE transmits the location updating request to the VLR2 where the new LAI is located, the method may further include that:

the HLR receiving the location updating request inserts user data into the VLR2.

Preferably, after the HLR inserts the user data into the VLR2, the method may further include that:

the VLR2 into which the user data has been inserted transmits a user data insertion response to the HLR.

Preferably, after the UE transmits the location updating request to VLR2 where the new LAI is located, the method may further include that:

the HLR receiving the location updating request performs location updating according to the received location updating request, and transmits an location updating acceptance message to the VLR2 after updating is finished.

Preferably, after the HLR transmits the location updating acceptance message to the VLR2 after updating is finished, the method may further include that:

the VLR2 receiving the location updating acceptance message transmits a location updating completion message to the UE.

Preferably, the network element may be an HLR, a Gateway Mobile Location Centre (GMLC) or an Unstructured Supplementary Service Data (USSD) service centre.

Another embodiment of the disclosure provides a non-call service processing method in a CSFB system, the method including that:

when UE falls back to a conventional circuit switch network and determines that its own LAI in the conventional circuit switch network is changed, the UE transmits a location updating request to a second VLR (VLR2) where a new LAI is located;

the VLR2 receiving the location updating request transmits a location updating request to an HLR, and transmits a Send Identity (SI) message carrying an address of the VLR2 to the VLR1;

the HLR receiving the location updating request transmits a location cancellation message to the VLR1 where original LAI is located;

the VLR1 receiving the location cancellation message and the SI message forwards a received non-call service request to the VLR2;

the VLR2 processes the received non-call service request, and transmits a processing result to the VLR1; and the VLR1 transmits the received processing result to a network element which transmitted the non-call service request.

One embodiment of the disclosure provides a VLR, which includes:

a non-call service request receiving unit, configured to receive a non-call service request from other VLR; and a request processing unit, configured to process the non-call service request received by the non-call service request receiving unit, and transmit a processing result to the other VLR.

One embodiment of the disclosure provides a VLR, which includes:

a message receiving unit, configured to receive a location cancellation message carrying an address of other VLR from an HLR, or receive a location cancellation message from the HLR and an SI message carrying the address of the other VLR from the other VLR;

a non-call service request forwarding unit, configured to forward a non-call service request transmitted by a network element to the other VLR after the message receiving unit receives the location cancellation message carrying the address of the other VLR or receives the location cancellation message and the SI message; and a processing result transmission unit, configured to transmit a processing result transmitted by the other VLR to the network element which transmitted the non-call service request.

The embodiment of the disclosure provides an HLR, which includes:

a location updating request receiving unit, configured to receive a location updating request from a second VLR (VLR2); and a message transmission unit, configured to transmit a location cancellation message or a location cancellation message carrying an address of the VLR2 to a first VLR (VLR1) after the location updating request receiving unit receives the location updating request from the VLR2.

One embodiment of the disclosure provides a non-call service processing system in a CSFB system, the system including UE, a second VLR (VLR2), an HLR, a first VLR (VLR1) and a network element, wherein the UE is configured to, when falling back to a conventional circuit switch network and determining that its own LAI in the conventional circuit switch network is changed, transmit a location updating request to the VLR2 where a new LAI is located;

the VLR2 is configured to, after receiving the location updating request from the UE, transmit a location updating request to the HLR, process a non-call service request transmitted by the VLR1, and transmit a processing result to the VLR1;

the HLR is configured to, after receiving the location updating request from the VLR2, transmit a location cancellation message carrying an address of the VLR2 to the VLR1 where original LAI is located;

the VLR1 is configured to, after receiving the location cancellation message from the HLR, forward the non-call service request transmitted by the network element to the VLR2, and transmit the processing result transmitted by the VLR2 to the network element which transmitted the non-call service request; and the network element is configured to transmit the non-call service request to the VLR1, and receive the processing result of the non-call service request from the VLR1.

Preferably, the network element is an HLR, a GMLC or a USSD service centre.

Another embodiment of the disclosure provides a non-call service processing system in a CSFB system, the system including UE, a second VLR VLR2, an HLR, a first VLR VLR1 and a network element, wherein the UE is configured to, when falling back to a conventional circuit switch network and determining that its own LAI in the conventional circuit switch network is changed, transmit a location updating request to VLR2 where a new LAI is located;

the VLR2 is configured to, after receiving the location updating request from the UE, transmit a location updating request to the HLR, transmit an SI message carrying an address of the VLR2 to the VLR1 where original LAI is located, and further configured to process a non-call service request transmitted by the VLR1, and transmit a processing result to VLR1;

the HLR is configured to, after receiving the location updating request from the VLR2, transmit a location cancellation message to the VLR1;

the VLR1 is configured to, after receiving the location cancellation message transmitted by the HLR and the SI message transmitted by the VLR2, forward the non-call service request transmitted by the network element to the VLR2, and further configured to transmit the processing result transmitted by the VLR2 to the network element which transmitted the non-call service request; and the network element is configured to transmit the non-call service request to the VLR1, and receive the processing result of the non-call service request from the VLR1.

From the above, the technical solutions of the embodiment of the disclosure include that: when the UE falls back to a conventional circuit switch network and determines that its own LAI in the conventional circuit switch network is changed, the UE transmits a location updating request to VLR2 where a new LAI is located; the VLR2 receiving the location updating request transmits a location updating request to an HLR; the HLR receiving the location updating request transmits a location cancellation message carrying the address of the VLR2 to the VLR1 where original LAI is located; the VLR1 receiving the location cancellation message forwards a received non-call service request to the VLR2; the VLR2 processes the received non-call service request, and transmits a processing result to the VLR1; the VLR1 transmits the received processing result to a network element which transmitted the non-call service request; therefore, the VLR1 transmits to the VLR2 the non-call service request received before fallback happens, the VLR2 processes the non-call service request and transmits a processing result to the VLR1, and then the VLR1 transmits the processing result to the network element which transmitted the non-call service request. By the embodiments of the disclosure, the interruption of a non-call service can be avoided, and the normal use of UE can be ensured.

DETAILED DESCRIPTION

Figure 1:
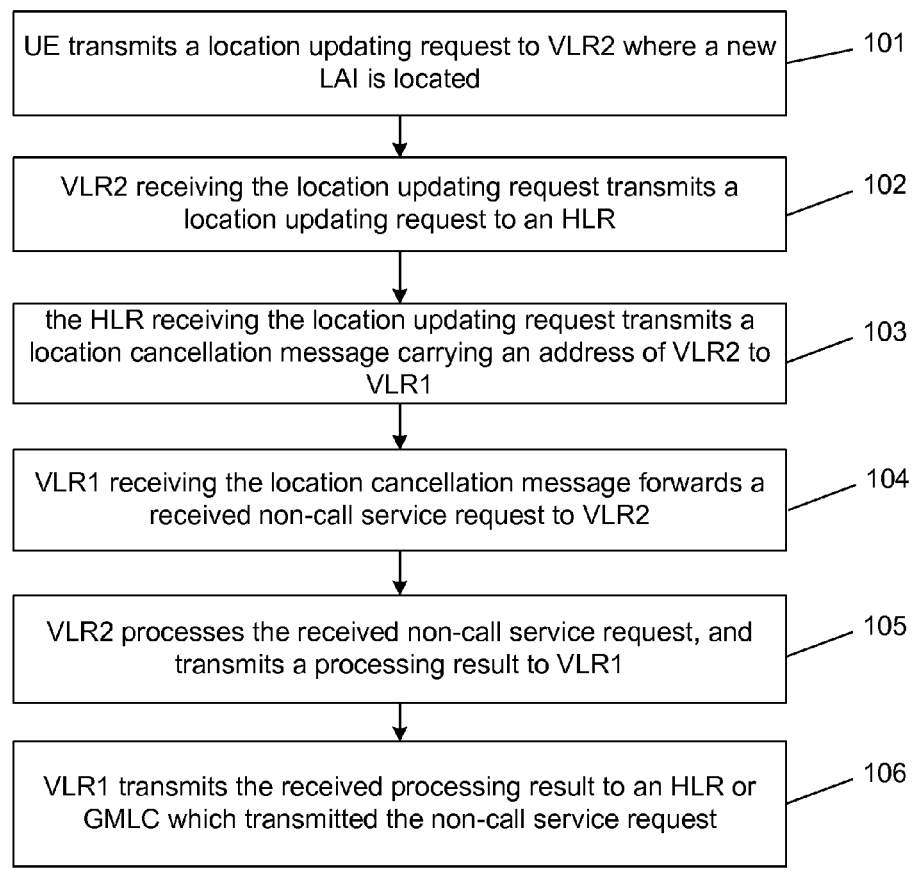
FIG. 1 is flowchart of a first embodiment of a non-call service processing method in a CSFB system according to the disclosure.

The disclosure provides a first embodiment of a non-call service processing method in a CSFB system, and as shown in FIG. 1, the method includes that:

Step 101: when UE falling back to a conventional circuit switch network and determines that its own LAI in the conventional circuit switch network is changed, the UE transmits a location updating request to a second VLR (VLR2) where a new LAI is located;

Step 102: the VLR2 receiving the location updating request transmits a location updating request to an HLR;

Step 103: the HLR receiving the location updating request transmits a location cancellation message carrying an address of the VLR2 to a first VLR (VLR1) where the original LAI is located;

Step 104: the VLR1 receiving the location cancellation message forwards a received non-call service request to the VLR2;

Step 105: the VLR2 processes the received non-call service request, and transmits a processing result to the VLR1; and Step 106: the VLR1 transmits the received processing result to a network element which transmitted the non-call service request.

Preferably, after the UE transmits the location updating request to the VLR2 where the new LAI is located, the method may further include that:

the HLR receiving the location updating request inserts user data to the VLR2.

Preferably, after the HLR inserts the user data to VLR2, the method may further include that:

the VLR2 to which the user data has been inserted transmits a user data insertion response to the HLR.

Preferably, after the UE transmits the location updating request to the VLR2 where the new LAI is located, the method may further include that:

the HLR receiving the location updating request performs location updating according to the received location updating request, and transmits an location updating acceptance message to the VLR2 after updating is finished.

Preferably, after the HLR transmits the location updating acceptance message to the VLR2 after updating is finished, the method may further include that:

VLR2 receiving the location updating acceptance message transmits a location updating completion message to the UE.

Preferably, the network element is an HLR, a Gateway Mobile Location Centre (GMLC) or an Unstructured Supplementary Service Data (USSD) service centre.

The disclosure discloses a second embodiment of the non-call service processing method in a CSFB system, the method including that:

Step 201: when UE falls back to a conventional circuit switch network and determines that its own LAI in the conventional circuit switch network is changed, the UE transmits a location updating request to VLR2 where a new LAI is located;

Step 202: the VLR2 receiving the location updating request transmits a location updating request to an HLR, and transmits an SI message carrying an address of the VLR2 to VLR1;

Step 203: the HLR receiving the location updating request transmits a location cancellation message to the VLR1 where the original LAI is located;

Step 204: the VLR1 receiving the location cancellation message and the SI message forwards a received non-call service request to the VLR2;

Step 205: the VLR2 processes the received non-call service request, and transmits a processing result to VLR1; and Step 206: the VLR1 transmits the received processing result to a network element which transmitted the non-call service request.

Figure 2:
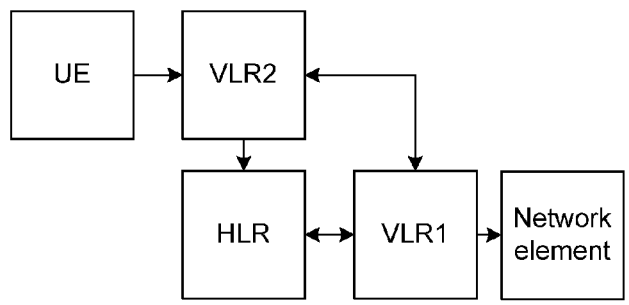
FIG. 2 is a structure diagram of a first embodiment of a non-call service processing system in a CSFB system according to the embodiment.

The disclosure provides a first embodiment of a non-call service processing system in a CSFB system, and as shown in FIG. 2, the system includes UE, VLR2, an HLR, VLR1 and a network element, wherein the UE is configured to, when falling back to a conventional circuit switch network and determining that its own LAI in the conventional circuit switch network is changed, transmit a location updating request to the VLR2 where a new LAI is located;

the VLR2 is configured to, after receiving the location updating request from the UE, transmit a location updating request to the HLR, process a non-call service request transmitted by the VLR1, and transmit a processing result to the VLR1;

the HLR is configured to, after receiving the location updating request from the VLR2, transmit a location cancellation message carrying an address of the VLR2 to the VLR1;

VLR1 is configured to, after receiving the location cancellation message from the HLR, forward the non-call service request transmitted by the network element to the VLR2, and further configured to transmit the processing result transmitted by the VLR2 to the network element which transmitted the non-call service request; and the network element is configured to transmit the non-call service request to the VLR1, and receive the processing result of the non-call service request from the VLR1.

Preferably, the network element is an HLR, a GMLC or a USSD service centre.

The disclosure provides a second embodiment of the non-call service processing system in a CSFB system, the system including UE, VLR2, an HLR, VLR1 and a network element, wherein the UE is configured to, when falling back to a conventional circuit switch network and determining that its own LAI in the conventional circuit switch network is changed, transmit a location updating request to the VLR2 where a new LAI is located;

the VLR2 is configured to, after receiving the location updating request from the UE, transmit a location updating request to the HLR, transmit an SI message carrying an address of the VLR2 to VLR1 where the original LAI is located; and further configured to process a non-call service request transmitted by the VLR1, and transmit a processing result to the VLR1;

the HLR is configured to, after receiving the location updating request from the VLR2, transmit a location cancellation message to the VLR1;

the VLR1 is configured to, after receiving the location cancellation message transmitted by the HLR and the SI message transmitted by the VLR2, forward the non-call service request transmitted by the network element to the VLR2, and transmit the processing result transmitted by the VLR2 to the network element which transmitted the non-call service request; and the network element is configured to transmit the non-call service request to the VLR1, and receive the processing result of the non-call service request from the VLR1.

Figure 3:
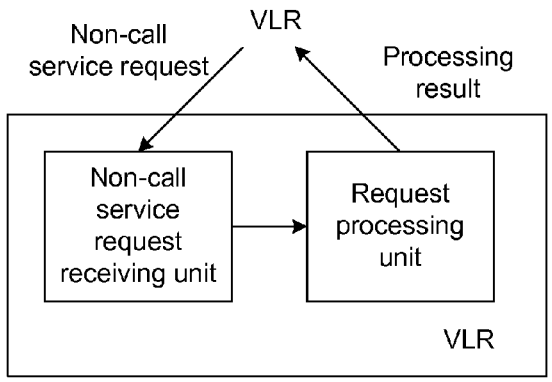
FIG. 3 is a structure diagram of an embodiment of a VLR provided by the disclosure.

The disclosure provides an embodiment of a VLR, and as shown in FIG. 3, the VLR includes:

a non-call service request receiving unit, configured to receive a non-call service request from other VLR; and a request processing unit, configured to process the non-call service request received by the non-call service request receiving unit, and transmit a processing result to the other VLR.

Figure 4:
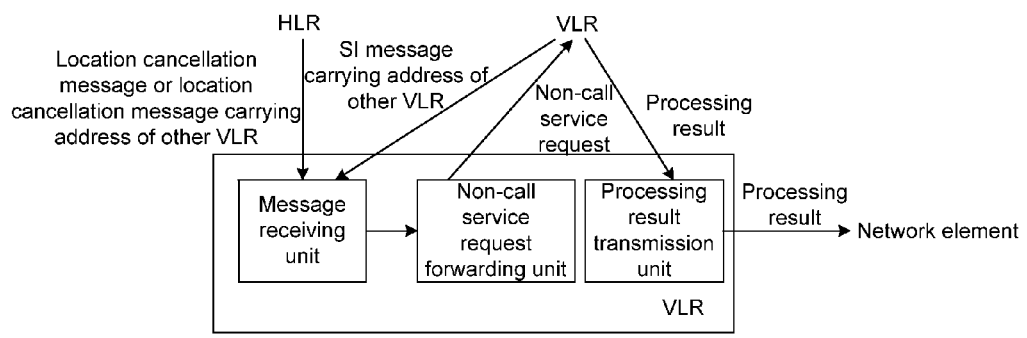
FIG. 4 is a structure diagram of another embodiment of another VLR provided by the disclosure.

The disclosure provides an embodiment of a VLR, and as shown in FIG. 4, the VLR includes:

a message receiving unit, configured to receive from an HLR a location cancellation message carrying an address of another VLR, or receive a location cancellation message from the HLR and an SI message carrying the address of the other VLR from the other VLR;

a non-call service request forwarding unit, configured to forward a non-call service request transmitted by a network element to the other VLR after the message receiving unit receives the location cancellation message carrying the address of the other VLR or the location cancellation message and the SI message; and a processing result transmission unit, configured to transmit a processing result transmitted by the other VLR to a network element which transmitted the non-call service request.

Figure 5:
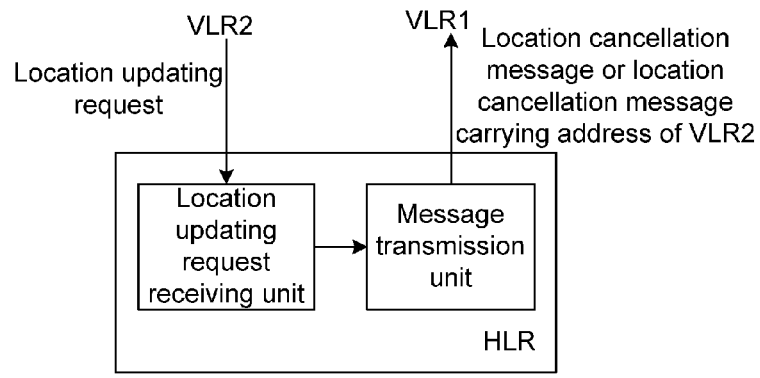
FIG. 5 is a structure diagram of an embodiment of an HLR provided by the disclosure.

The disclosure provides an embodiment of an HLR, and as shown in FIG. 5, the HLR includes:

a location updating request receiving unit, configured to receive a location updating request from VLR2; and a message transmission unit, configured to transmit to VLR1 a location cancellation message or a location cancellation message carrying an address of the VLR2 after the location updating request receiving unit receives the location updating request from the VLR2.

The VLR1 is a VLR where the original LAI is located when an LAI of UE in a conventional circuit switch network is changed; and the VLR2 is a VLR where a new LAI is located when the LAI of the UE in the conventional circuit switch network is changed.

Figure 6:
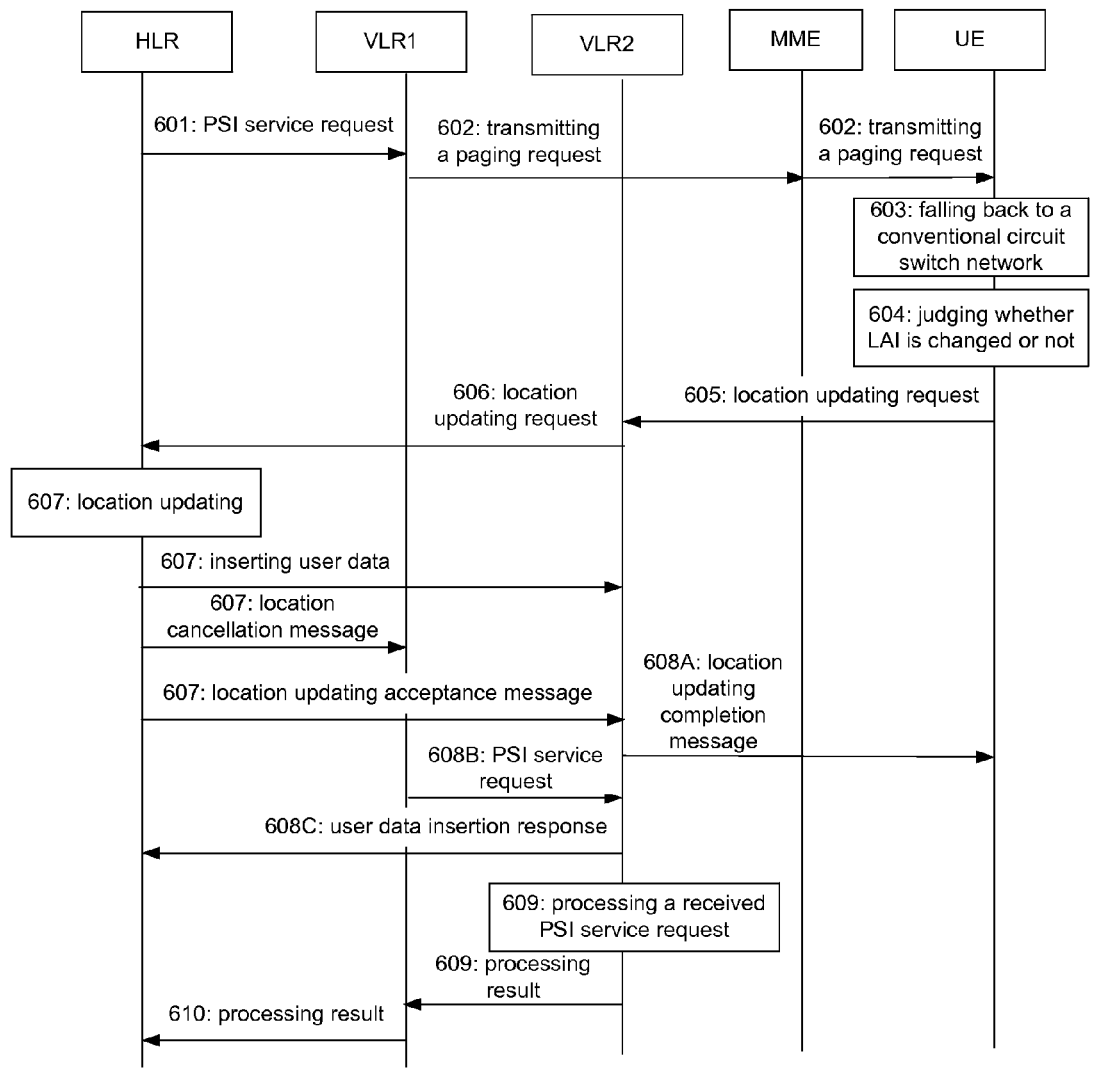
FIG. 6 is a flowchart of a third embodiment of a non-call service processing method in a CSFB system according to the disclosure.

A third embodiment of the non-call service processing method in a CSFB system provided by the disclosure is described below, a non-call service in the embodiment is a PSI service, and as shown in FIG. 6, the method includes the following steps that:

Step 601: an HLR transmits a PSI service request to a first VLR (VLR1);

here, the PSI service request is a PSI message;

Step 602: the VLR1 receiving the PSI service request transmits a paging request to UE through a Mobility Management Entity (MME), wherein the paging request includes a fallback mark bit for marking whether the UE falls back to a conventional circuit switch network or not;

Step 603: the UE falls back to the conventional circuit switch network according to the fallback mark bit;

Step 604: the UE judges whether its own LAI in the conventional circuit switch network is changed or not, and when the LAI of the UE in the conventional circuit switch network is changed, Step 605 is executed; and when the LAI of the UE in the conventional circuit switch network is unchanged, this flow is ended;

Step 605: a location updating request is transmitted to a second VLR (VLR2) where a new LAI is located;

Step 606: the VLR2 transmits a location updating request according to the received location updating request;

Step 607: the HLR receiving the location updating request inserts user data to the VLR2, transmits to the VLR1 a location cancellation message which carries an address of VLR2, performs location updating according to the received location updating request, and transmits an location updating acceptance message to the VLR2 after updating is finished;

Step 608A: the VLR2 receiving the location updating acceptance message transmits a location updating completion message to the UE;

Step 608B: the VLR1 receiving the location cancellation message forwards the received PSI service request to the VLR2;

Step 608C: the VLR2 into which the user data has been inserted transmits a user data insertion response to the HLR;

Step 609: the VLR2 processes the received PSI service request, and transmits a processing result to the VLR1; and Step 610: the VLR1 forwards the received processing result to the HLR.

Figure 7:
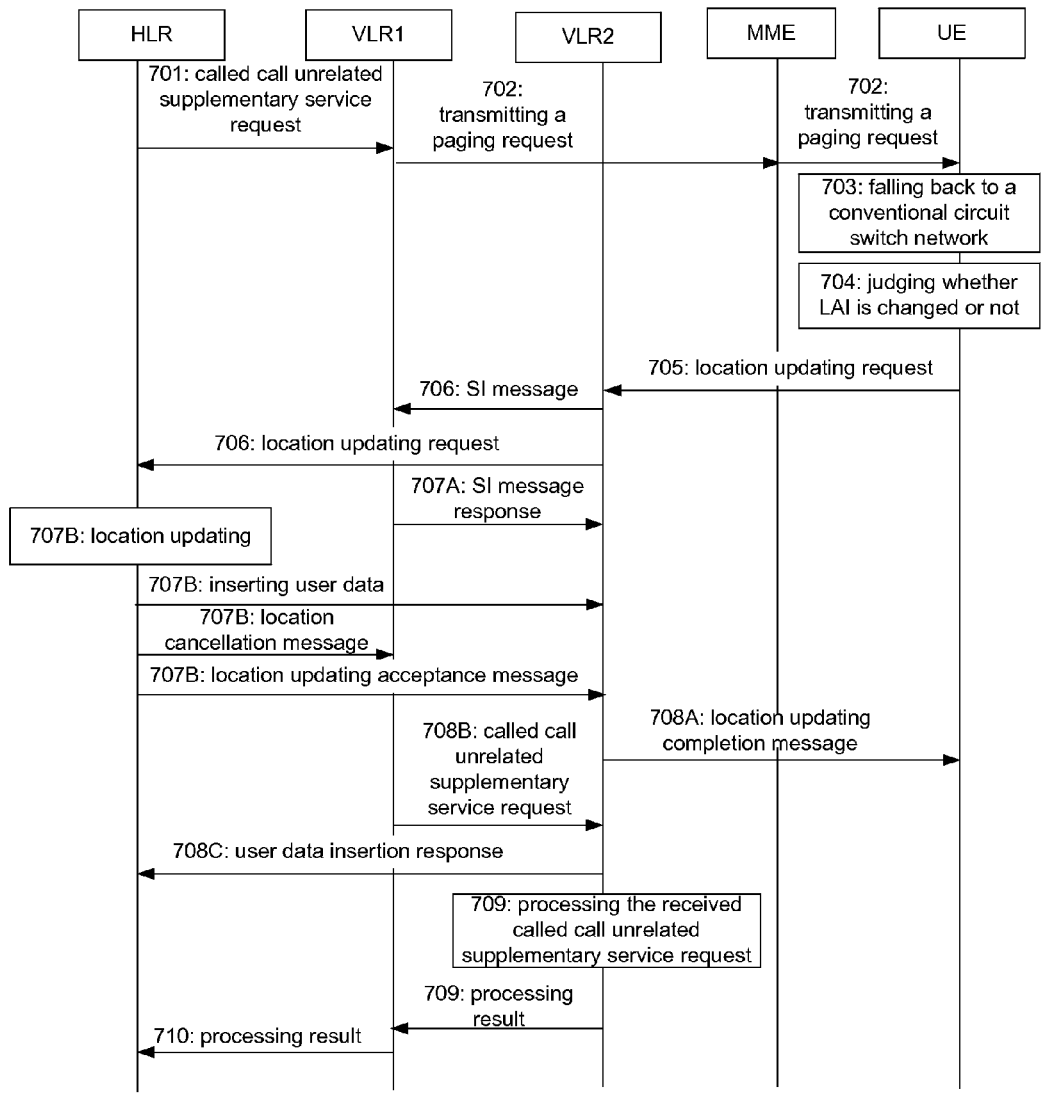
FIG. 7 is a flowchart of a fourth embodiment of a non-call service processing method in a CSFB system according to the disclosure.

A fourth embodiment of the non-call service processing method in a CSFB system provided by the disclosure is described below, a non-call service in the embodiment is a called call unrelated supplementary service, and as shown in FIG. 7, the method includes the following steps that:

Step 701: an HLR transmits a called call unrelated supplementary service request to a first VLR (VLR1);

in practice, the called call unrelated supplementary service may also be transmitted to the VLR1 by a USSD service centre;

Step 702: VLR1 receiving the called call unrelated supplementary service transmits a paging request to UE through an MME, wherein the paging request includes a fallback mark bit for marking whether the UE falls back to a conventional circuit switch network or not;

Step 703: the UE falls back to the conventional circuit switch network according to the fallback mark bit;

Step 704: the UE judges whether its own LAI in the conventional circuit switch network is changed or not, and when the LAI of the UE in the conventional circuit switch network is changed, Step 705 is executed; and when the LAI of the UE in the conventional circuit switch network is unchanged, this flow is ended;

Step 705: a location updating request is transmitted to a second VLR (VLR2) where a new LAI is located;

Step 706: the VLR2 receiving the location updating request transmits to the VLR1 an SI message which carries an address of VLR2, and transmits a location updating request to the HLR according to the received location updating request;

Step 707A: the VLR1 receiving the SI message transmits an SI message response to the VLR2;

Step 707B: the HLR receiving the location updating request inserts user data into the VLR2, transmits a location cancellation message to VLR1, performs location updating according to the received location updating request, and transmits an location updating acceptance message to the VLR2 after updating is finished;

Step 708A: the VLR2 receiving the location updating acceptance message transmits a location updating completion message to the UE;

Step 708B: the VLR1 receiving the location cancellation message forwards the received called call unrelated supplementary service request to the VLR2;

Step 708C: the VLR2 into which the user data has been inserted transmits a user data insertion response to the HLR;

Step 709: the VLR2 processes the received called call unrelated supplementary service request, and transmits a processing result to the VLR1; and Step 710: the VLR1 forwards the received processing result to the HLR.

Figure 8:
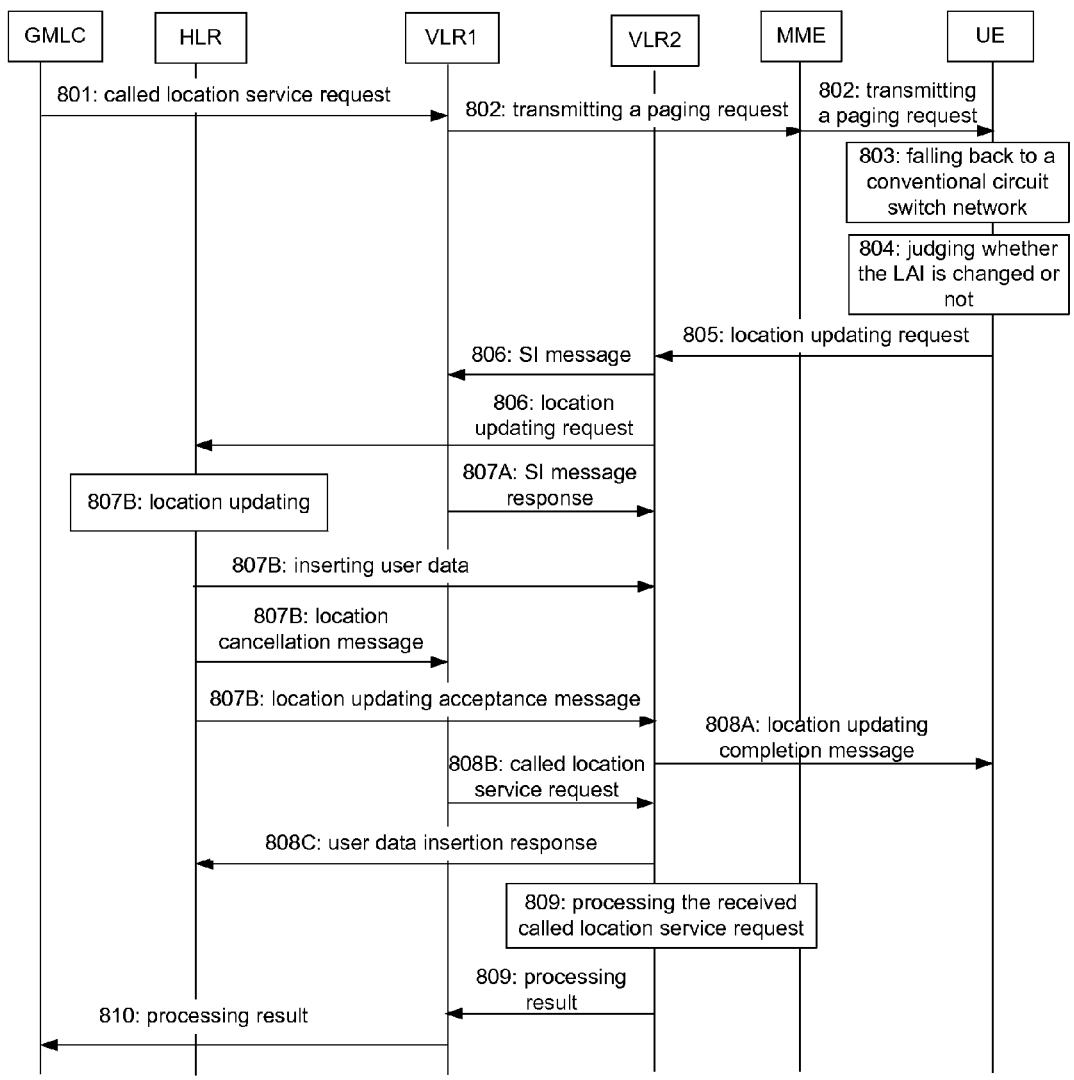
FIG. 8 is a flowchart of a fifth embodiment of a non-call service processing method in a CSFB system according to the disclosure.

A fifth embodiment of the non-call service processing method in a CSFB system provided by the disclosure is described below, a non-call service in the embodiment is a called location service, and as shown in FIG. 8, the method includes the following steps that:

Step 801: a GMLC transmits a called location service request to a first VLR (VLR1);

here, the called location service request is a Provide Subscriber Location (PSL) message;

Step 802: the VLR1 receiving the called location service request transmits a paging request to UE through an MME, wherein the paging request includes a fallback mark bit for marking whether the UE falls back to a conventional circuit switch network or not;

Step 803: the UE falls back to the conventional circuit switch network according to the fallback mark bit;

Step 804: the UE judges whether its own LAI in the conventional circuit switch network is changed or not, and when the LAI of the UE in the conventional circuit switch network is changed, Step 805 is executed; and when the LAI of the UE in the conventional circuit switch network is unchanged, this flow is ended;

Step 805: a location updating request is transmitted to a second VLR (VLR2) where a new LAI is located;

Step 806: the VLR2 receiving the location updating request transmits to the VLR1 an SI message which carries an address of the VLR2, and transmits a location updating request to an HLR according to the received location updating request;

Step 807A: the VLR1 receiving the SI message transmits an SI message response to the VLR2;

Step 807B: the HLR receiving the location updating request inserts user data into VLR2, transmits a location cancellation message to the VLR1, performs location updating according to the received location updating request, and transmits an location updating acceptance message to the VLR2 after updating is finished;

Step 808A: the VLR2 receiving the location updating acceptance message transmits a location updating completion message to the UE;

Step 808B: the VLR1 receiving the location cancellation message forwards the received called location service request to the VLR2;

Step 808C: the VLR2 into which the user data has been inserted transmits a user data insertion response to the HLR;

Step 809: the VLR2 processes the received called location service request, and transmits a processing result to the VLR1; and Step 810: the VLR1 forwards the received processing result to the GMLC.

The above are only the embodiments of the disclosure and are not intended to limit the scope of protection of the disclosure.

What is claimed is:

1. A non-call service processing method in a Circuit Switch Fallback (CSFB) system, the method comprising:
   when User Equipment (UE) falls back to a conventional circuit switch network and determines that its own Location Area Identity (LAI) in the conventional circuit switch network is changed, transmitting, by the UE, a location updating request to a second Visitor Location Register (VLR) VLR2 where a new LAI without reliance on an MME is located;
   transmitting, by the VLR2 receiving the location updating request, a location updating request to a Home Location Register (HLR);
   transmitting, by the HLR receiving the location updating request, a location cancellation message carrying an address of the VLR2 to a first VLR (VLR1) where original LAI is located;
   forwarding, by the VLR1 receiving the location cancellation message, a non-call service request received to the VLR2 wherein the non-call service request is a request for a non-call service including a Provide Subscriber Information (PSI) service, a called call unrelated supplementary service and a called location service;
   processing, by the VLR2, the received non-call service request, and transmitting a processing result to the VLR1; and
   transmitting, by the VLR1, the received processing result to a network element which transmitted the non-call service request.

2. The method according to claim 1, after transmitting the location updating request to the VLR2 where the new LAI is located, the method further comprising:
   inserting, by the HLR receiving the location updating request, user data into the VLR2.

3. The method according to claim 2, after inserting, by the HLR, the user data into the VLR2, the method further comprising:
   transmitting, by the VLR2 into which the user data has been inserted, a user data insertion response to the HLR.

4. The method according to claim 1, after transmitting the location updating request to the VLR2 where the new LAI is located, the method further comprising:
   performing, by the HLR receiving the location updating request, location updating according to the received location updating request, and transmitting an location updating acceptance message to the VLR2 after updating is finished.

5. The method according to claim 4, after transmitting the location updating acceptance message to the VLR2 after updating is finished, the method further comprising:
   transmitting, by the VLR2 receiving the location updating acceptance message, a location updating completion message to the UE.

6. The method according to claim 1, wherein the network element is an HLR, a Gateway Mobile Location Centre (GMLC) or an Unstructured Supplementary Service Data (USSD) service centre.

7. A non-call service processing method in a Circuit Switch Fallback (CSFB) system, the method comprising:
   when User Equipment (UE) falls back to a conventional circuit switch network and determines that its own Location Area Identity (LAI) in the conventional circuit switch network is changed, transmitting, by the UE a location updating request to a second Visitor Location Register (VLR) VLR2 where a new LAI without reliance on an MME is located;

transmitting, by the VLR2 receiving the location updating request, a location updating request to a Home Location Register (HLR), and transmitting a Send Identity (SI) message carrying an address of the VLR2 to a first VLR (VLR1);

transmitting, by the HLR receiving the location updating request, a location cancellation message to the VLR1 where original LAI is located;

forwarding, by the VLR1 receiving the location cancellation message and the SI message, a non-call service request received to the VLR2 wherein the non-call service request is a request for a non-call service including a Provide Subscriber Information (PSI) service, a called call unrelated supplementary service and a called location service;

processing, by the VLR2, the non-call service request received, and transmitting a processing result to the VLR1; and transmitting, by the VLR1, the received processing result to a network element which transmitted the non-call service request.

8. A non-call service processing system in a Circuit Switch Fallback (CSFB) system, the system comprising User Equipment (UE), a second Visitor Location Register (VLR) VLR2, a Home Location Register (HLR), a first VLR (VLR1) and a network element, wherein
 the UE comprises a memory storing programming instructions and a processor configured to be capable of executing the stored programming instructions to perform steps comprising: when falling back to a conventional circuit switch network and determining that its own Location Area Identity (LAI) in the conventional circuit switch network is changed, transmitting a location updating request to the VLR2 where a new LAI without reliance on an MME is located;
 the VLR2 comprise a memory storing programming instructions and a processor configured to be capable of executing the stored programming instructions to perform steps comprising: after receiving the location updating request from the UE, transmitting a location updating request to the HLR; and further processing a non-call service request transmitted by the VLR1, and transmitting a processing result to the VLR1;
 the HLR comprises a memory storing programming instructions and a processor configured to be capable of executing the stored programming instructions to perform steps comprising: after receiving the location updating request from the VLR2, transmitting a location cancellation message carrying an address of the VLR2 to the VLR1 where original LAI is located;
 the VLR1 comprises a memory storing programming instructions and a processor configured to be capable of executing the stored programming instructions to perform steps comprising: after receiving the location cancellation message from the HLR, forwarding the non-call service request transmitted by the network element to the VLR2, and further transmitting the processing result transmitted by the VLR2 to the network element which transmitted the non-call service request; and
 the network element comprises a memory storing programming instructions and a processor configured to be capable of executing the stored programming instructions to perform steps comprising: transmitting the non-call service request to the VLR1, and receiving the processing result of the non-call service request from the VLR1 wherein the non-call service request is a request for a non-call service including a Provide Subscriber Information (PSI) service, a called call unrelated supplementary service and a called location service.

9. The system according to claim 8, wherein the network element is an HLR, a Gateway Mobile Location Centre (GMLC) or an Unstructured Supplementary Service Data (USSD) service centre.

10. A non-call service processing system in a Circuit Switch Fallback (CSFB) system, the system comprising User Equipment (UE), a second Visitor Location Register (VLR) VLR2, a Home Location Register (HLR), a first VLR (VLR1) and a network element; wherein
 the UE comprises a memory storing programming instructions and a processor configured to be capable of executing the stored programming instructions to perform steps comprising: when falling back to a conventional circuit switch network and determining that its own Location Area Identity (LAI) in the conventional circuit switch network is changed, transmitting a location updating request to the VLR2 where a new LAI without reliance on an MME is located;
 the VLR2 comprises a memory storing programming instructions and a processor configured to be capable of executing the stored programming instructions to perform steps comprising: after receiving the location updating request from the UE, transmitting a location updating request to the HLR, transmitting a Send Identity (SI) message carrying an address of the VLR2 to the VLR1 where original LAI is located; and further processing a non-call service request transmitted by the VLR1, and transmitting a processing result to the VLR1;
 the HLR comprises a memory storing programming instructions and a processor configured to be capable of executing the stored programming instructions to perform steps comprising: after receiving the location updating request from the VLR2, transmitting a location cancellation message to the VLR1;
 the VLR1 comprises a memory storing programming instructions and a processor configured to be capable of executing the stored programming instructions to perform steps comprising: after receiving the location cancellation message transmitted by the HLR and the SI message transmitted by the VLR2, forwarding the non-call service request transmitted by the network element to the VLR2; and further transmitting the processing result transmitted by the VLR2 to the network element which transmitted the non-call service request; and
 the network element comprises a memory storing programming instructions and a processor configured to be capable of executing the stored programming instructions to perform steps comprising: transmitting the non-call service request to the VLR1, and receiving the processing result of the non-call service request from the VLR1 wherein the non-call service request is a request for a non-call service including a Provide Subscriber Information (PSI) service, a called call unrelated supplementary service and a called location service.

* * * * *